(12) United States Patent
Gebert et al.

(10) Patent No.: US 8,134,490 B2
(45) Date of Patent: Mar. 13, 2012

(54) SYNTHETIC APERTURE RADAR PROCESS

(75) Inventors: Nicolas Gebert, München (DE); Gerhard Krieger, Planegg (DE)

(73) Assignee: Deutsches Zentrum fur Luft-und Raumfahrt E.V. (DE)

( * ) Notice: Subject to any disclaimer, the term of this patent is extended or adjusted under 35 U.S.C. 154(b) by 0 days.

(21) Appl. No.: 12/675,879

(22) PCT Filed: Aug. 8, 2008

(86) PCT No.: PCT/EP2008/006553
§ 371 (c)(1),
(2), (4) Date: Mar. 1, 2010

(87) PCT Pub. No.: WO2009/030339
PCT Pub. Date: Mar. 12, 2009

(65) Prior Publication Data
US 2010/0164785 A1  Jul. 1, 2010

(30) Foreign Application Priority Data

Aug. 30, 2007 (DE) .......................... 10 2007 041 373

(51) Int. Cl.
*G01S 13/00* (2006.01)
(52) U.S. Cl. ..................................... 342/25 R; 342/25 A
(58) Field of Classification Search ....................... 342/25
See application file for complete search history.

(56) References Cited

U.S. PATENT DOCUMENTS

| | | | | |
|---|---|---|---|---|
| 5,185,608 A | * | 2/1993 | Pozgay | 342/17 |
| 5,243,348 A | * | 9/1993 | Jackson | 341/64 |
| 5,485,384 A | * | 1/1996 | Falconnet | 701/207 |
| 5,559,518 A | * | 9/1996 | DiDomizio | 342/174 |
| 5,818,383 A | * | 10/1998 | Stockburger et al. | 342/109 |
| 6,400,306 B1 | * | 6/2002 | Nohara et al. | 342/25 R |

(Continued)

FOREIGN PATENT DOCUMENTS

CN  1 808 175 A  7/2006

(Continued)

OTHER PUBLICATIONS

Krieger, G.; Gebert, N.; Moreira, A.; "Unambiguous SAR signal reconstruction from nonuniform displaced phase center sampling", Aug. 2004, Geoscience and Remote Sensing Letters, IEEE, vol. 1, issue 4, pp. 260-264.*

(Continued)

*Primary Examiner* — Timothy A Brainard
(74) *Attorney, Agent, or Firm* — Hoffmann & Baron, LLP (57) ABSTRACT

A continually adapted pulse-to-pulse shift, performed in the azimuth direction, of the phase center which is electrically active on the side of the transmitting antenna (Tx; $Tx_1$, $Tx_2$, $Tx_3$), in connection with the SAR antenna control of a multi-aperture SAR system is designed such that, in the case of an existing pulse repetition frequency (PRF) due to the likewise shifted position of the effective phase center of the entire antenna (Tx; $Tx_1$, $Tx_2$, $Tx_3$; Rx; $Rx_1$, $Rx_2$, $Rx_3$), a compensation or complete correction of non-equidistant scanning in the azimuth direction is achieved. The principle of the pulse-to-pulse shift of the position of the effective phase center of the antenna for achieving the best possible equidistant scanning can be expanded to the side of the receiving antenna (Rx; $Rx_1$, $Rx_2$, $Rx_3$) and to multi-aperture antennas. The technological solution proposed by the invention can be advantageously combined with a subsequent digital beam formation on the receiving antenna side.

12 Claims, 10 Drawing Sheets

U.S. PATENT DOCUMENTS

| | | | |
|---|---|---|---|
| 2004/0090360 A1* | 5/2004 | Vincent | 342/25 |
| 2004/0150547 A1* | 8/2004 | Suess et al. | 342/25 A |
| 2006/0239119 A1 | 10/2006 | Hartka et al. | |
| 2007/0247353 A1* | 10/2007 | Budic | 342/159 |
| 2008/0246647 A1* | 10/2008 | Hellsten | 342/22 |
| 2009/0102705 A1* | 4/2009 | Obermeyer | 342/25 F |

FOREIGN PATENT DOCUMENTS

| | | |
|---|---|---|
| DE | 10 2006 033 922 A1 | 1/2007 |
| EP | 1 241 487 A1 | 9/2002 |

OTHER PUBLICATIONS

Krieger, G. Gebert, N.; Moreira, A.; "Unambiguous SAR signal reconstruction from nonuniform displaced phase center sampling" Aug. 2004, Geoscience and Remote Sensing Letters, IEEE, vol. 1, issue 4, pp. 260-264.*

Seuss, M. et al.; "A novel high resolution, wide swath SAR system"; IGARSS 2001. IEEE 2001 International Geoscience and Remote Sensing Symposium, Sydney, Australia; Jul. 9-13, 2001; New York, NY; IEEE, US; vol. 3, pp. 1013-1015.

Lombardo, P. et al.; "An alternating transmit approach for STAP with short antenna arrays"; Radar Conference, 2004; Proceedings of the IEEE Philadelphia, PA, USA, Apr. 26-29, 2004; Piscataway, NJ, USA, IEEE; pp. 420-425.

Gebert, N. et al.; "SAR signal reconstruction from non-uniform displaced phase centre sampling in the presence of perturbations"; Geoscience and Remote Sensing Symposium, 2005; IGARSS '05; Proceedings; 2005 IEEE International Seoul, Korea, Jul. 25-29, 2005; Piscataway, NY, USA, IEEE, vol. 2, pp. 1034-1037.

Krieger, G. et al.; "Unambiguous SAR Signal Reconstruction From Nonuniform Displaced Phase Center Sampling"; IEEE Geoscience and Remote Sensing Letters, 20041001 IEEE Service Center, New York, NY, US; vol. 1, Nr. 4, pp. 260-264.

Younis, M.; "Digital Beam-Forming for High-Resolution Wide Swath Real and Synthetic Aperture Radar"; Forschungsberichte aus dem Institute fur Hochstfrequenztechnik and Elektronik der Universitat Karlsruhe (TH), 20040722 Prof. Dr.-Ing. W. Wiesbeck.

Wu Shunhua et al.; "Analysis and simulation of spatial interval non-uniform samples in azimuth multiple phase centers SAR"; Signal Processing, 2004; Proceedings; ICSP '04 2004; 7th International Conference on Beijing, China; Aug. 31-Sep. 4, 2004; Piscataway, NJ, USA, IEEE; vol. 3, pp. 2175-2178.

Krieger G. et al., "SAR signal reconstruction from non-uniform displaced phase centre sampling"; Geoscience and Remote Sensing Symposium, 2004; IGARSS '04; Proceedings; 2004 IEEE International Anchorage, AK, USA, Sep. 20-24, 2004; Piscataway, NJ, USA, IEEE, vol. 3, pp. 1763-1766.

Cooper, P.S. et al; "High resolution synthetic aperture radar using a multiple sub-band technique"; Radar '97, Edinburgh, Oct. 14-16, 1997; IEE Conference Publication, London; IEE, GB; vol. No. 449, pp. 263-267.

Sedehi, M. et al.; "A Study for a Space-Based Passive Multi-Channel SAR"; GTTI Annual Meeting (Gruppo nazionale Telecomunicazioni e Teoria dell'Informazione), 20070618; 20070618-20070620; pp. 1-16.

Diego Cristallini et al.; "Adaptive antenna configuration for unambiguous signal reconstruction in dual-channel SAR systems"; Radar Conference, 2007; EuRAD 2007; European, 20071001 IEEE, Pi; pp. 107-110.

* cited by examiner

SYNTHETIC APERTURE RADAR PROCESS

TECHNICAL FIELD

The invention relates to a synthetic aperture radar method for remote sensing of the surface of the earth using one or a plurality of carrier platforms moving at a constant speed over the surface of the earth, wherein said one or plurality of carrier platforms comprise a multi-aperture antenna system beam-controllable in the azimuth direction and directed obliquely downwards orthogonally to the moving direction and thus to the azimuth direction and consisting of a transmitting and receiving antenna system, and further comprise a coherently operating radar device periodically transmitting high-frequency pulses at a pulse-repetition frequency via the transmitting antenna system and receiving echo signals via the receiving antenna system, wherein effective azimuth phase centers which are assigned to the received echo signals referred to as scan values, are arranged at a spatial site in the azimuth direction, which spatial site corresponds to the geometric center between the phase center of the transmitting antenna system that is actually electrically active during the transmission of the high-frequency pulses and the phase center of the receiving antenna system that is actually electrically active during the reception of the echo signals.

Figure 1:
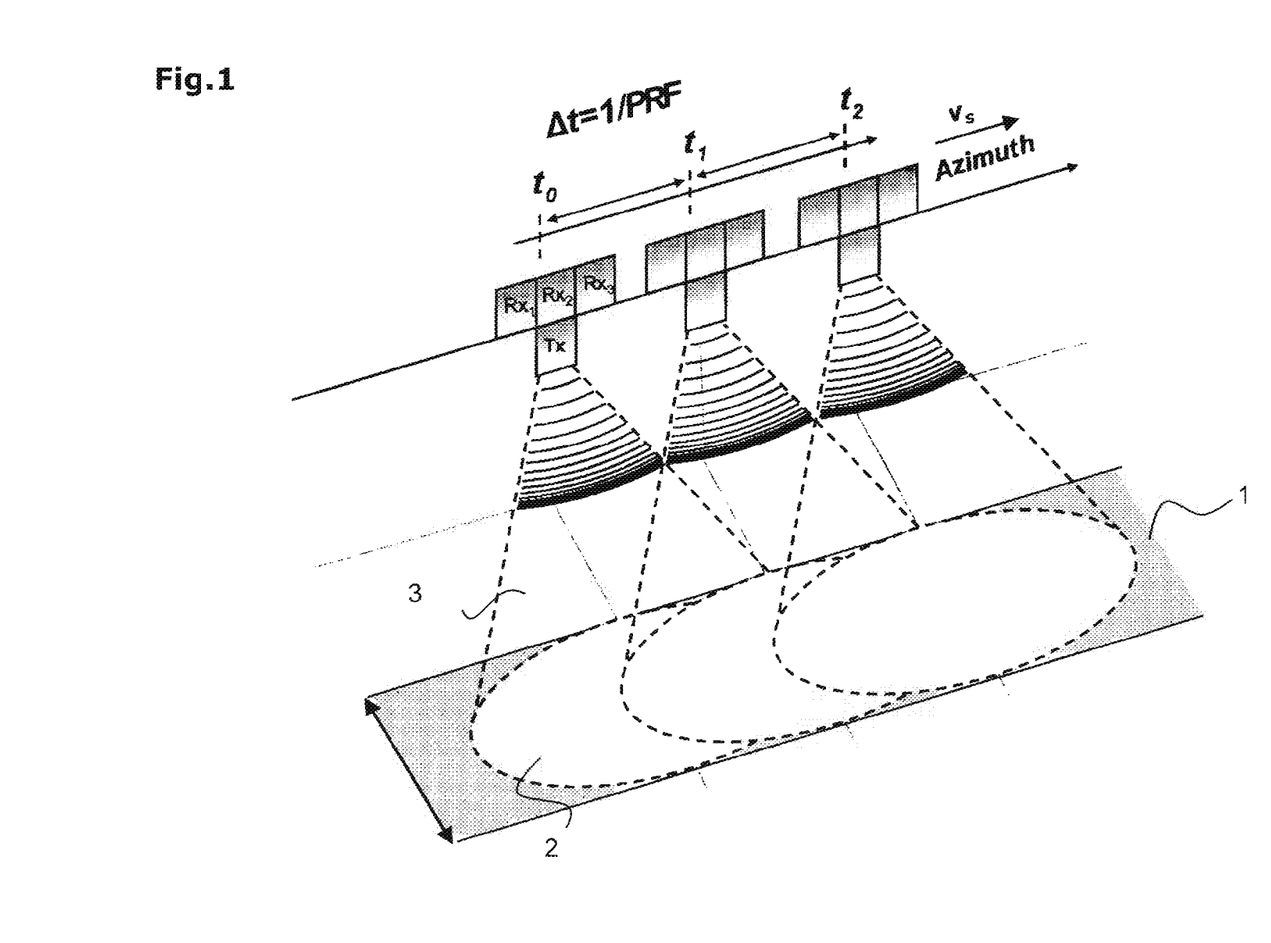
FIG. 1 is a schematic view of a conventional multi-aperture SAR system as already described above, wherein a sensor moves at a constant speed $v_s$ along the azimuth direction and, in the process, the transmitting antenna at three consecutive times $t_0$, $t_1$ and $t_2$ transmits pulses at a pulse repetition frequency PRF, which pulses are scattered back on the ground and are received by each of the exemplary three receiving apertures.

A radar with synthetic aperture, abbreviated SAR, is an instrument for remote sensing which is increasingly finding application in imaging, surveyance and examination of the surface of the earth. Already switch-on and switch-off of certain elements can be considered as beam control. As shown in FIG. 1, such a radar system comprises one or a plurality of carrier platforms moving at a constant speed $v_s$ over the surface of the earth and provided with a transmitting antenna Tx directed orthogonally to the moving direction, and a plurality of receiving antennae $Rx_i$ (in the illustrated embodiment, three receiving antennae $Rx_1$, $Rx_2$ and $Rx_3$) directed in the same manner, and a coherently operating radar device periodically transmitting electromagnetic high-frequency pulses via the transmitting antenna Tx at pulse repetition frequency abbreviated as PRF.

The direction of the movement of the carrier platforms is called the azimuth direction, and the direction orthogonal thereto, oriented diagonally downward, is called the distance direction. In the normal SAR operating mode which is called the strip mapping mode, there is imaged, during the flight over a region to be surveyed, a ground strip 1 having the length of the distance covered by the flight. Herein, the receiving antenna in the azimuth direction consists either of N separate receiving apertures on the same carrier platform or of N receiving antennae on separate carrier platforms.

STATE OF THE ART

In the example of a multi-aperture SAR system illustrated in FIG. 1, the radar sensor moves at a constant speed $v_s$ along the azimuth direction while, at the times $t_0$, $t_1$ und $t_2$, the transmitting antenna Tx will emit, at the pulse repetition frequency PRF, pulses which will be scattered back on the ground and be received by each of the three exemplary receiving apertures $Rx_1$, $Rx_2$ und $Rx_3$. Signals reflected from a point-shaped target ("point target") at the ground will be received as echoes as long as the target is arranged within the incidence surface 2 of the antenna lobe 3. The length of the course during which a target makes a contribution to the receiving signal is referred to as a synthetic aperture.

It is decisive that, for each of the high-frequency signals transmitted by the high-frequency antenna Tx, there are received N echo signals, i.e. respectively one echo signal per receiving aperture $Rx_i$, ($Rx_1$, $Rx_2$, $Rx_3$ in FIG. 1), i.e. three echo signals in the example illustrated in FIG. 1, which signals, after reception in the corresponding N receiving apertures in the radar device will be mixed down, quadrature-modulated, digitized and stored in an echo signal memory.

The spatial site in the azimuth direction that is assigned to the received echo signal, the so-called "scan value", is referred to as the "effective phase center" and corresponds to the geometric center between the electrically active phase center of the transmitter (Tx) and the electrically active phase center of the respective receiving aperture (Rxi). The phase center of an individual aperture or antenna will normally be located in its center of gravity. Thus, the effective phase center of the transmitting/receiving combination will be determined by the distance between the transmitting aperture and the receiving apertures.

Figure 2:
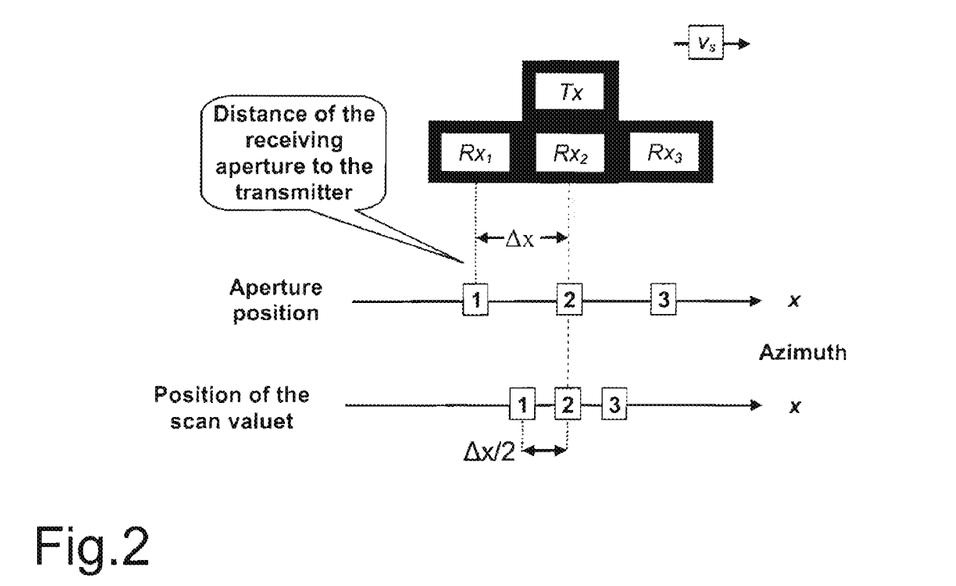
FIG. 2 shows, as already described above, the azimuth positions x of an exemplary number of three receiving apertures and of one transmitting aperture on a carrier platform ("aperture position") and the positions of the associated effective phase centers which determine the site of the scan value ("position scan value")
Figure 3:
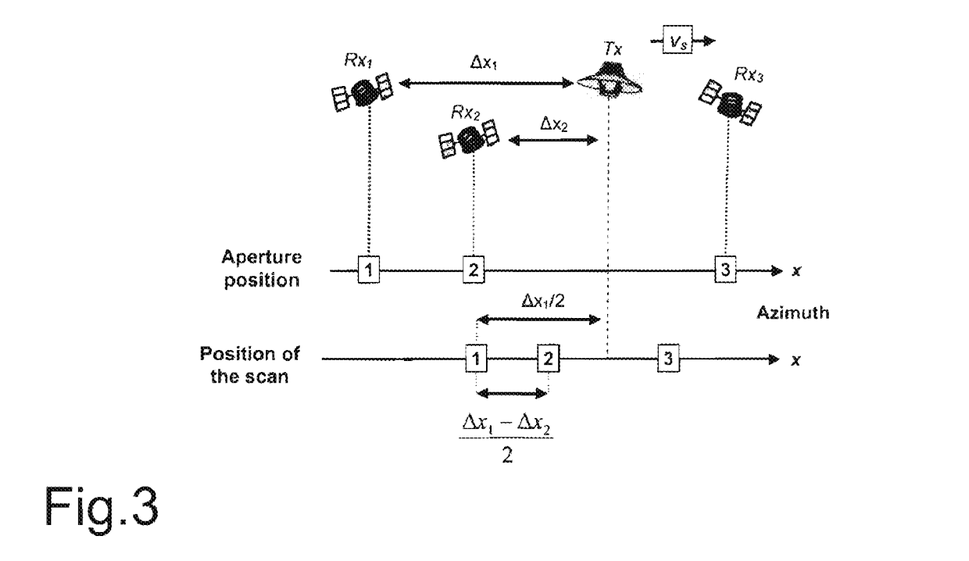
FIG. 3 shows, likewise as already described above, the azimuth positions x of an exemplary number of three receiving apertures on separate carriers ("aperture position") and the positions of the associated effective phase centers which determine the site of the scan value ("position scan value")

FIG. 2 illustrates, in this regard, an example of an antenna comprising a plurality of receiving apertures $Rx_1$, $Rx_2$ und $Rx_3$ and a transmitting aperture Tx on a carrier platform moving at a speed $v_s$ in the azimuth direction. FIG. 3, on the other hand, shows a plurality of receiving antennae $Rx_1$, $Rx_2$ und $Rx_3$ and a transmitting antenna Tx on separate carrier platforms, all of which are moving at a speed $v_s$ in the azimuth direction.

Illustrated in FIG. 2 and FIG. 3 are the azimuth positions x, therein referred to as aperture positions, of the three exemplary receiving apertures $Rx_1$, $Rx_2$ und $Rx_3$ and respectively receiving antennae $Rx_1$, $Rx_2$ und $Rx_3$, and the positions x, therein referred to as position scan values, of the associated effective phase centers determining the site of the scan value.

In FIG. 2, the distance between the two outer receiving apertures $Rx_1$ and respectively $Rx_3$ on the one hand and the transmitting aperture Tx on the other hand is each time $\Delta x$, and the transmitting aperture Tx in the azimuth direction coincides with the central receiving aperture $Rx_2$. The three effective phase centers have a distance $\Delta x/2$ from each other in the azimuth direction, the central one of the three effective phase centers coinciding with the aperture position of the transmitting aperture Tx and the central receiving aperture $Rx_2$.

In FIG. 3, the distance from the transmitting antenna Tx to the receiving antenna $Rx_1$ is $\Delta x_1$ and the distance to the receiving antenna $Rx_2$ is $\Delta x_2$. Thus, the distance of the first effective phase center to the transmitting antenna Tx is $\Delta x_1/2$, and the distance between the first and second effective phase centers is $$\frac{\Delta x_1 - \Delta x_2}{2}.$$

The third effective phase center is arranged in the geometric center between the transmitting antenna Tx and the third receiving antenna $Rx_3$.

The spatial distance in the azimuth direction at the same receiver between the received echo signals of successive transmitting pulses is determined by the covered distance of transmitter and receiver between the pulses. Thus, the distance can be computed from the product of the sensor speed $v_s$ and the reciprocal value of the pulse repetition frequency PRF which directly corresponds to the time span between two transmitting pulses.

Figure 4:
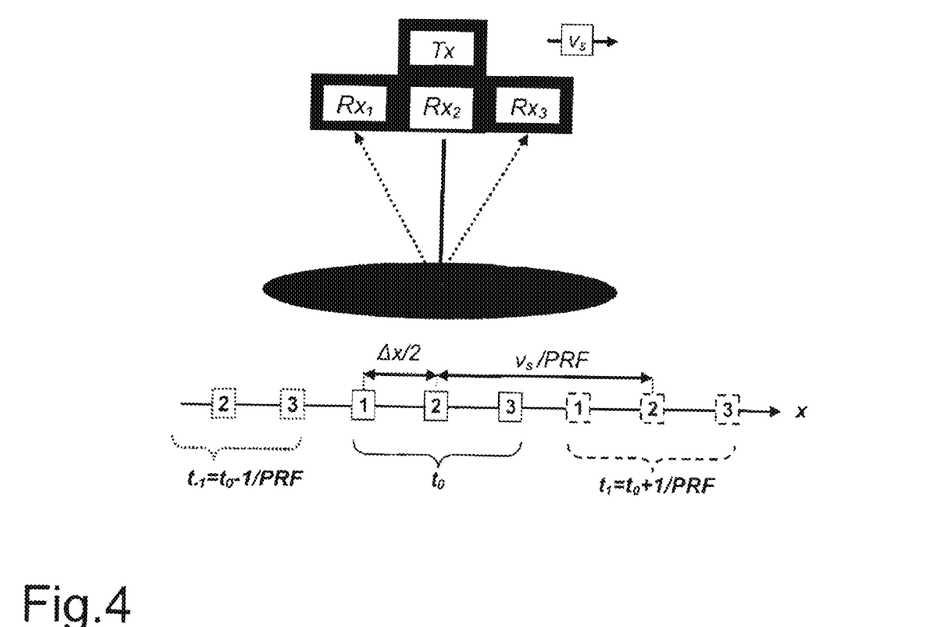
FIG. 4 shows, likewise as already described above, the spatial scan for a transmitted pulse sequence in a reception-side multi-aperture SAR antenna on a carrier platform.

The spatial position of the scan values which results for a transmitted sequence of pulses for a receiver-side multi-aperture antenna on a single carrier platform (the so-called spatial scan), is shown in FIG. 4. In the illustrated case, there are provided, as in FIG. 2, three receiving apertures $Rx_1$, $Rx_2$ and $Rx_3$ and one transmitting aperture Tx which with respect to the azimuth position coincides with the central receiving aperture $Rx_2$.

Figure 5:
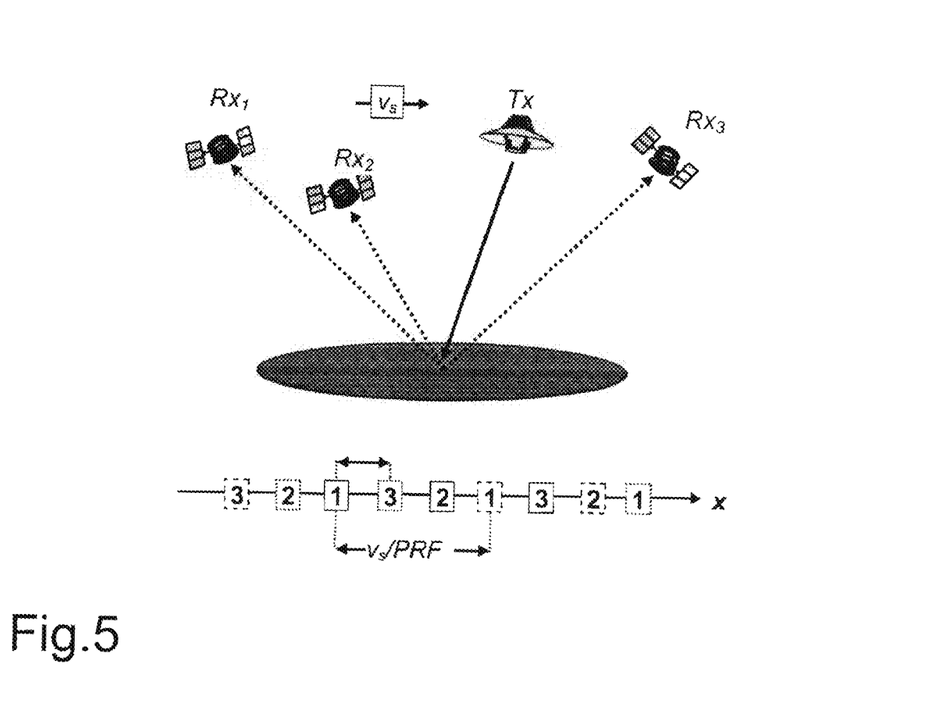
FIG. 5 shows, likewise as already described above, the spatial scan for a transmitted pulse sequence for a plurality of receiving antenna on separate carrier platforms.

FIG. 5 illustrates the spatial position of the scan values which results for a transmitted pulse sequence for a plurality of receiving antennae on separate carrier platforms. In the illustrated case, there are provided, as in FIG. 3, three separate receiving antennae $Rx_1$, $Rx_2$ and $Rx_3$ and a separately arranged transmitting antenna Tx. For a system with separate receiving antennae on separate carrier platforms, one will obtain substantially the same scenario for the spatial scanning as in the case of FIG. 4 while, however, it is to be observed that spatially adjacent pulses will not necessarily belong to echo signals of the same transmitting pulse.

As already mentioned above, the spatial position of the scan value is determined by the distance of the transmitting aperture and the transmitting antenna to the respective receiving aperture and respectively receiving antenna. This means that the distance of the scan values—belonging to the same transmitting pulse—of different receivers is ultimately determined by the distance of the receiving apertures and respectively receiving antennae from each other. In contrast thereto, the distance of the scan values belonging to the same receiving aperture and respectively receiving antenna but to different scan pulses, is determined by the speed of the sensors as well as by the pulse repetition frequency PRF.

It can now be seen that only a specific combination of the distance of the receiving apertures and respectively receiving antennae to each other as well as the sensor speed $v_s$ and the pulse repetition frequency PRF, will ensure that all scan values will have the same distance from each other, i.e. that a so-called equidistant scanning exists.

For the exemplary case of a number N of receiving apertures which all are arranged on the same carrier platform and are separated from each other by a distance $\Delta x$, there results the following condition which has to be fulfilled for an equidistant scanning:

$$\Delta x = \frac{2 \cdot v_s}{PRF \cdot N}. \qquad (1)$$

It can be observed that, for a predetermined total length $L_a$ of the antenna which is "distributed" among N receiving apertures of the length $\Delta x$, the following pulse repetition frequency PRF is obtained for which the scan will become equidistant:

$$PRF = \frac{2 \cdot v_s}{N \cdot \Delta x} = \frac{2 \cdot v_s}{L_a}. \qquad (2)$$

Conversely, this means that, for a pulse repetition frequency PRF differing therefrom, the scanning will be non-equidistant, i.e. the scan values will have different distances to each other. As a rule, it is virtually impossible to design an SAR system for operation with only one pulse repetition frequency PRF because, for instance, imaging a wide range of incident angles by use of the radar system will require several different PRF values.

Thus, in each SAR system comprising a plurality of receiving apertures or antennae, a non-equidistant scanning of the azimuth signal will normally be unavoidable, which ultimately will manifest itself in a deterioration of the quality of the radar image in the form of increasing azimuth ambiguities and increased noise generation. This entails the necessity of a correction of the non-equidistant scanning in order to correct or at least reduce the negative effects of this non-equidistant scanning on the quality of the radar image.

Figure 6:
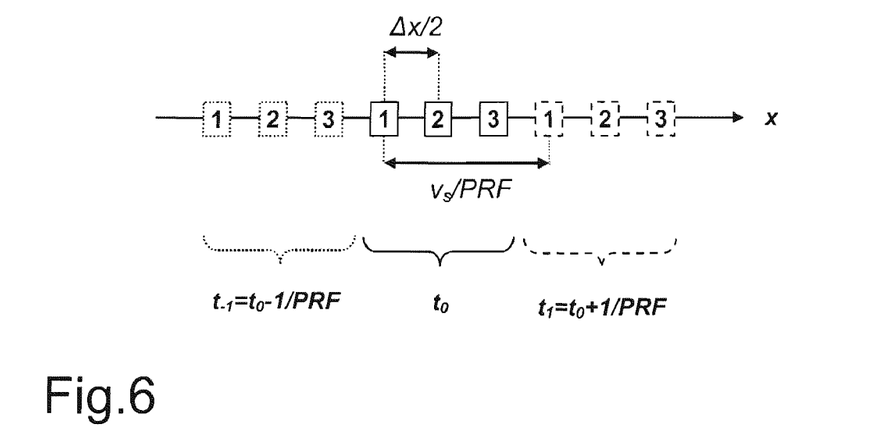
FIG. 6 shows, likewise as already described above, an equidistant scanning, wherein scan values for three successive pulses (marked by dots, continuous lines, interrupted lines) are represented for a system with three receivers and the distance between two transmitted pulses corresponds exactly to half the antenna wavelength.
Figure 7:
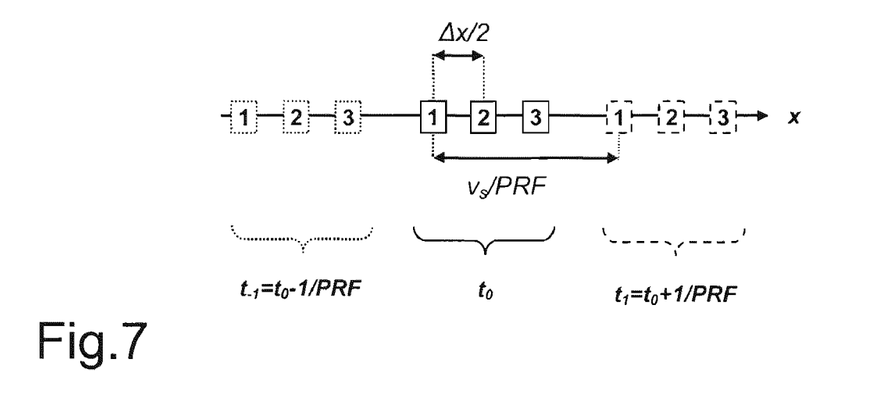
FIG. 7 shows, likewise as already described above, a non-equidistant scanning at a too low pulse repetition frequency PRF, wherein scan values for three successive pulses (marked by dots, continuous lines, interrupted lines) are represented for a system with three receivers.
Figure 8:
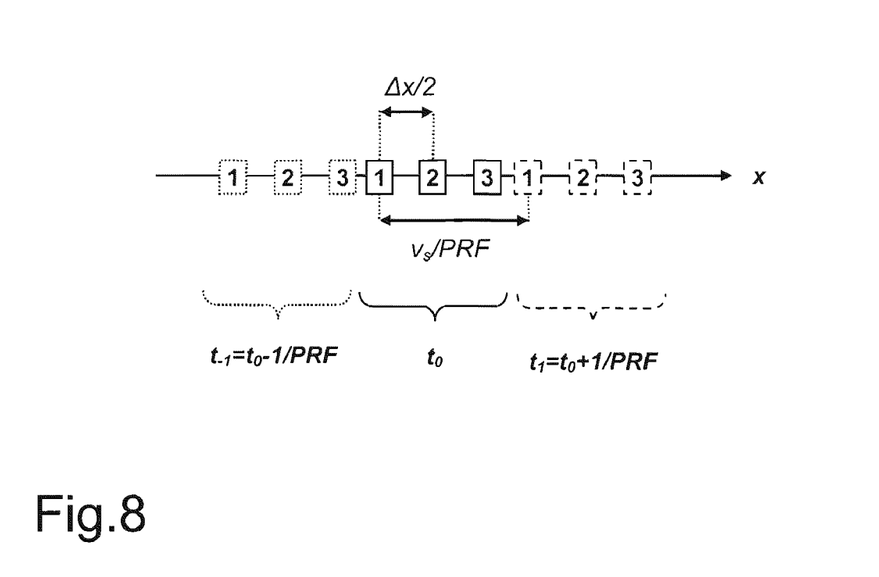
FIG. 8 shows, likewise as already described above, a non-equidistant scanning at a too high pulse repetition frequency PRF, wherein scan values for three successive pulses (marked by dots, continuous lines, interrupted lines) are represented for a system with three receivers.

FIG. 6 to FIG. 8 illustrate, by way of example, the arrangement of the scan values for the optimal pulse repetition frequency PRF at which the distance between two transmitting pulses correspond exactly to half the antenna length (equidistant scanning, cf. FIG. 6), as well as the non-equidistant scanning in case of a too low PRF value (cf. FIG. 7) and a too high PRF value (cf. FIG. 8).

The representations have been selected in an exemplary manner for an SAR system where the receiving apertures are arranged on a sole carrier platform. For an SAR system with receiving antennae on separate carrier platforms, however, the basic interrelationships will be no different. Shown in FIG. 6 to FIG. 8 are respective scan values for three successive pulses (marked by dots, continuous lines, interrupted lines) in an SAR system with three receiving antennae.

Up to now, in SAR multi-aperture systems, efforts have been made—if at all—to solve the problem of a non-equidistant scanning in the azimuth direction by performing a pre-processing of the received and digitized echo signals prior to the actual SAR processing. This pre-processing of the echo signal in the azimuth direction in the form of the so-called digital beam forming on the receiving side ("digital beam-forming on receive") is based on a Doppler-frequency-dependent weighting and a subsequent coherent summation of the individual receiving signals, which serves primarily for suppressing the azimuth ambiguities occurring due to non-equidistant scanning. Solutions related to an azimuth pre-processing are known from:

G. Krieger, N. Gebert, A. Moreira: "Unambiguous SAR Signal Reconstruction from Nonuniform Displaced Phase Center Sampling", IEEE Geoscience and Remote Sensing Letters, Vol. 1, pages 260-264, 2004;

M. Younis: "Digital beam-forming for high-resolution wide swath real and synthetic aperture radar", Karlsruhe, Germany, 2004;

N. Gebert, G. Krieger, A. Moreira: "SAR Signal Reconstruction from Non-Uniform Displaced Phase Centre Sampling in the Presence of Perturbations", Proceedings of Geoscience and Remote Sensing Symposium (IGARSS), Seoul, South Korea, 2005; and H. Li, H. Wang, T. Su, Z. Bao: "Generation of Wide-Swath and High-Resolution SAR Images From Multichannel Small Spaceborne SAR System", IEEE Geoscience and Remote Sensing Letters, Vol. 2 (1), pages 82-86, January 2005.

An essential feature of all these known concepts and SAR systems is the receiving-side processing of the signals. The function of the transmitting antenna resides exclusively in safeguarding the large-surfaced illumination of the target area. Thus, in these systems, the size of the transmitting antenna in the azimuth direction substantially corresponds to the size a single receiving aperture. This means that the whole receiving antenna will finally have larger dimensions than the transmitting antenna.

The proposed approaches which as of yet have become known in this regard are all relying on a signal-processing-based solution for correction of the problems resulting from a non-equidistant scanning in the azimuth direction. This digital beam-forming on the receiving side ("digital beam-forming on receive") allows e.g. for the complete suppression of azimuth ambiguities if the pulse repetition frequency PRF can be adapted to the speed of the platform and to the antenna length, i.e. if an equidistant scanning exists.

Even though deviations from the optimum pulse repetition frequency PRF will now result in a significantly improved suppression of the azimuth ambiguities as compared to system without pre-processing, they will also cause a reduced suppression of ambiguities in comparison with the optimum pulse repetition frequency PRF. The more non-equidistant the scan values are located, the worse the suppression in this regard will be, so that the radar system may happen to operate with pulse repetition frequencies PRF for which no sufficient suppression can be guaranteed anymore.

This is accompanied by a deterioration of further characteristic values by the processing, such as e.g. of the signal/ noise ratio SNR. Also here, the high sensitivity of such errors with regard to the spatial scanning can lead to errors in the radar image which will have a disturbing effect if, due to the timing, only an unfavorable pulse repetition frequency PRF can be selected that will entail massively non-equidistant scan values. Thus, the main problem of the "digital beam-forming on receive" substantially resides in the lack of flexibility of the SAR system towards large variations of the pulse repetition frequency PRF.

Further still, all of the presented multi-aperture SAR radar systems typically have a large receiving antenna. This antenna, however, is not used for transmission purposes although, for the suppression of ambiguities and for obtaining a higher yield, it would be helpful to profit from the large antenna surface also on the transmitting side. Beyond this, the use of a common transmitting and receiving antenna would make it possible to employ well-proven T/R technologies (transmission/reception switching).

The imaging and/or surveillance of the largest possible area with the highest possible geometric resolution for earth surveillance requires radar systems with synthetic aperture which comprise a plurality of separate receiving apertures on a carrier platform or a plurality of receiving antennae on different carrier platforms and thus are able to receive, on the whole, a plurality of echoes for each transmitted high-frequency pulse.

Normally, these receiving apertures and respectively receiving antennae are arranged, inter alia, beside each other in the flight direction (="azimuth" direction), which will require the observance of a strict precondition for the ratio of the speed, the size and the number of receiving apertures of the SAR sensor in relation to the pulse repetition frequency PRF.

In the article P. Lombardo, F. Colone: "An Alternating Transmit Approach for STAP with Short Antenna Arrays" in Radar Conference 2004, Proceedings of the IEEE, publication date Apr. 26-29, 2004, pages 420-425, ISSN: 1097-5659, ISBN: 0-7803-8234-X, there is indicated a solution for improving the detection by enlarging the distance between phase centers of an antenna system wherein the phase center of a transmitting antenna is alternately switched from a leading to a trailing sub-array of the antenna. The transmission-side phase centers mentioned in document D2 can take only two fixed positions and are not adaptable. This known method does not allow for any flexible adaptation of the transmission-side phase centers and consequently the effective phase centers to different values of the pulse repetition frequency.

To sum up, it is thus to be concluded that radar systems with synthetic aperture (SAR) are remote surveillance instruments which are suited for flexible use and which, in earth surveillance, have been found useful in a large variety of applications. However, because of their image-taking principle, these systems have an inherent restriction which makes it impossible to image large regions and at the same time obtain a high geometric resolution.

This restriction can be eliminated by so-called multi-aperture SAR systems which on the reception side comprise a plurality of separate receiving aperture and respectively receiving antennae which in the flight direction ("azimuth" direction) of the carrier platform(s) are arranged beside each other. A basic restriction of such systems, however, consists in the necessity of fine-tuning to each other the speed, the size and the number of the separate receiving apertures and respectively receiving antennae of the radar sensor and the used pulse repetition frequency PRF of the system (the so-called "condition for equidistant scanning"). Otherwise, the quality of the captured radar image will deteriorate.

DESCRIPTION OF THE INVENTION

It is an object of the invention to overcome the above rigid demands and restrictions and thus to decisively improve the flexibility and the performance of future imaging SAR methods.

According to the invention which relates to a synthetic aperture radar method of the initially mentioned type, the above object is achieved in that, by a pulse-to-pulse shift of the electrically active phase center of the transmitting antenna system designed as a multi-aperture antenna which is beam-controllable in the azimuth direction, and/or of the electrically active phase center of the receiving antenna system designed as a multi-aperture antenna which is beam-controllable in the azimuth direction, the position of the effective azimuth phase center is continuously adapted in such a manner that, at the existing pulse repetition frequency, a substantially equidistant scanning is effected in the azimuth direction.

In a multi-aperture SAR system which on the receiving side comprises a plurality of receiving antenna apertures in the azimuth direction, the present invention achieves the posed object by a novel concept for the configuration and operation of the transmitting antenna system. The novel concept makes it possible to flexibly change the electrically active center of the transmitting antenna system, i.e. the so-called "phase center" thereof, during image capturing.

Thereby, it is rendered possible, by continuous adaptation of the transmitting-antenna phase center, to compensate for the deviations from the strict precondition, given on the receiving side, for equidistant scanning. This allows for possibility to loosen the strictly required relationship between the speed, size and number of the SAR sensor elements and the pulse repetition frequency PRF and to reduce the negative effects on the quality of the image occurring due to a violation of said precondition.

Advantageous and useful modifications of the synthetic-aperture radar system according to the present invention are indicated in the subclaims related directly or indirectly to claim 1.

DESCRIPTION OF THE INVENTION

As already in the above descriptional text, an "element" will hereunder refer to the smallest unit of an antenna which is adapted to be controlled separately. The signals received or transmitted by the elements will finally be combined, group-wise, to apertures. An individual aperture can then be used separately as an antenna, or a plurality of apertures on the same carrier platform will form a multi-aperture antenna.

The basis of the present invention is an SAR system which also on the transmission side comprises an antenna with a plurality of separate transmitting elements adapted to be controlled individually. In the simplest case, said controlling will consist in switch-on or switch-off of the element; however, it can also be provided that each element is controlled with the aid of a variable phase and/or amplitude assignment, thus achieving a "tapering" of the antenna characteristic as can be seen in FIG. 9 and FIG. 10.

Figure 9:
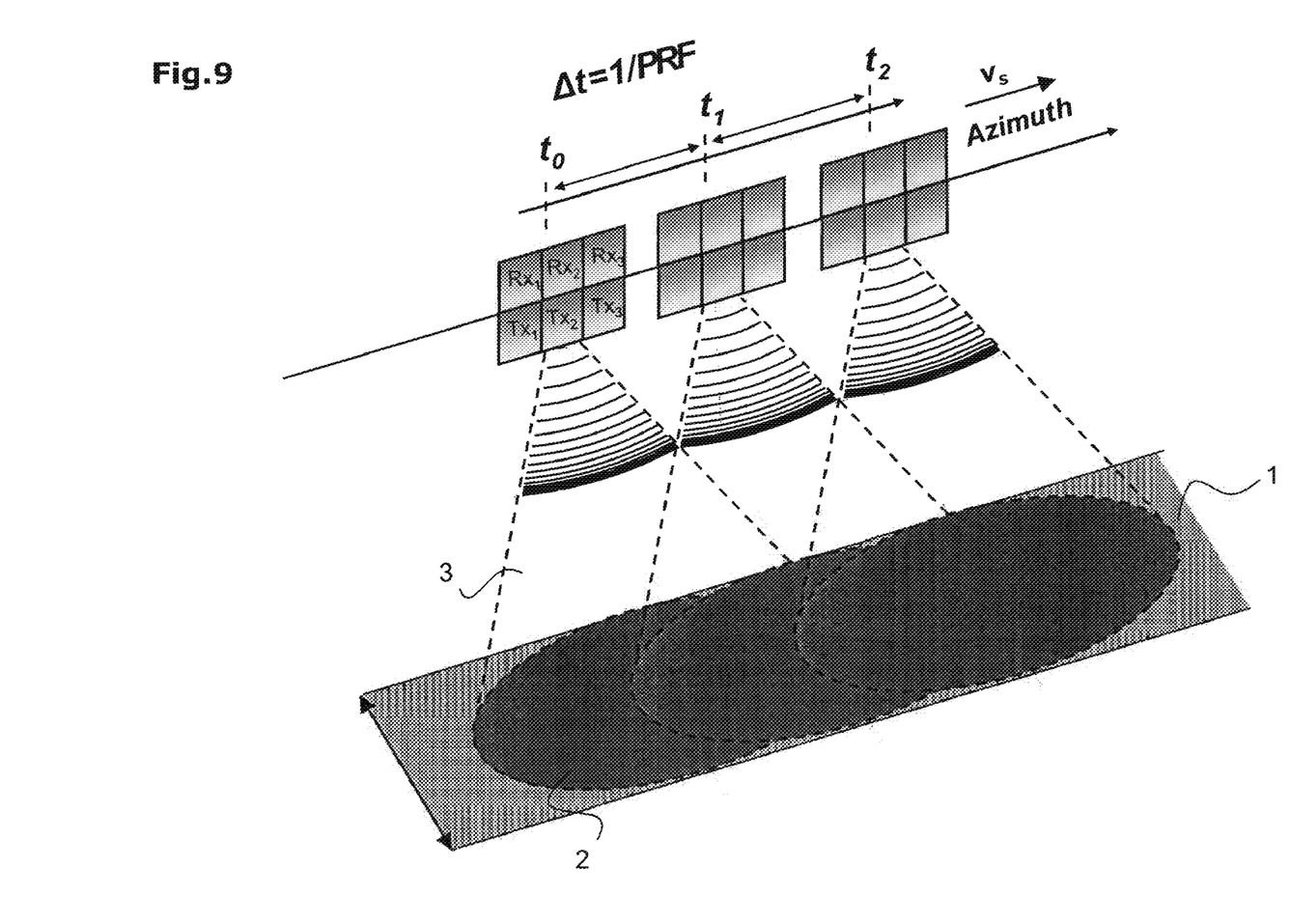
FIG. 9 shows a system concept according to the present invention comprising a multi-element transmitting antenna in comparison to the conventional SAR system shown in FIG. 1, wherein, in contrast to the conventional approach, the antenna comprises a plurality of transmitting antenna elements adapted to be controlled separately.

In contrast to the system concept illustrated in FIG. 1, the antenna system according to FIG. 9, shown substantially in identical representation, comprises a plurality of transmitting elements $Tx_1$ to $Tx_3$ adapted to be controlled separately. In this regard, it is irrelevant whether these are pure transmitting elements or use is made of well-proven T/R technology, i.e. transmission/reception switching, in order to make use of the size of the receiving antenna also for the transmitting antenna. For reasons of clarity, however, the Figures to be explained hereunder refer, by way of example, to a system with separate transmitting and receiving elements.

Figure 10:
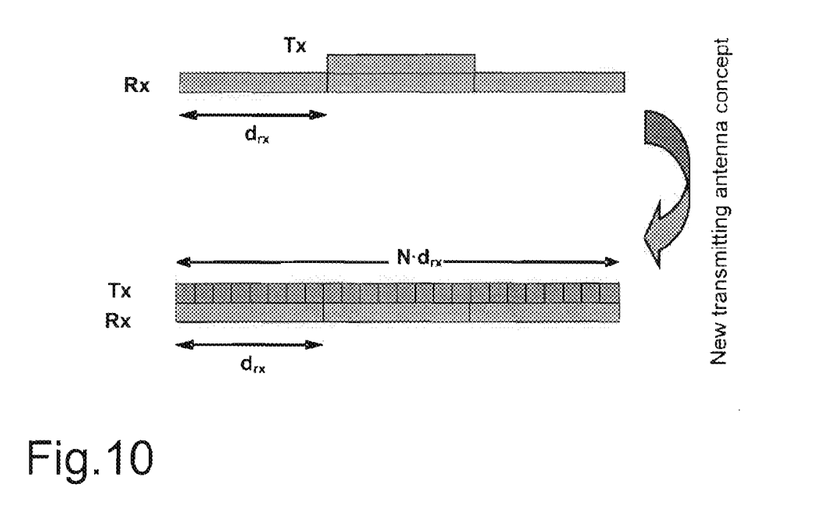
FIG. 10 shows the transition from a single transmitting antenna to a transmitting antenna comprising a plurality of transmitting antenna elements adapted to be controlled separately, in this exemplary case combined with three receiving apertures, for an SAR system according to the present invention.

FIG. 10 shows the transition from a single transmitting antenna Tx (upper part of FIG. 10) arranged in the central region of the overall extension of the receiving antenna Rx to a transmitting antenna comprising a plurality of transmitting elements (lower part of FIG. 10) adapted to be controlled separately and being distributed over the whole receiving antenna aperture Rx.

The extension of the three central regions of the receiving antenna Rx is respectively $d_{rx}$. In the illustrated example, N=3 holds true.

In comparison to the state of the art in multi-aperture SAR systems up to now, such an antenna allows for a variable control of the transmitting elements to the effect that only selected areas of the antenna are used. The phase center of the antenna is then arranged in the geometric center of the elements used. This offers the possibility, provided by the invention, to shift the phase center of the transmitting antenna.

Figure 11:
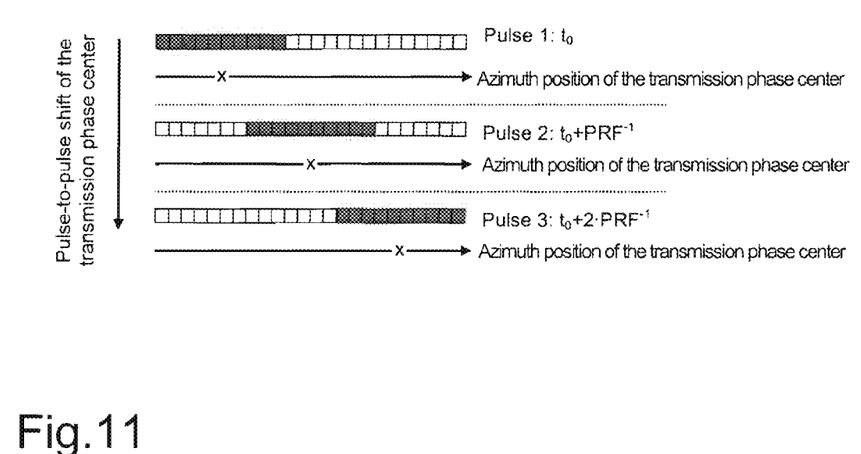
FIG. 11 shows various resulting phase centers in the azimuth direction for three different activations of the transmitting antenna for an SAR system according to the present invention, wherein, in each case, active transmitting antenna elements are represented by grey shading and inactive transmitting antenna elements are kept transparent.

FIG. 11 illustrates how a change of the control will entail a defined displacement of the phase center of the transmitting antenna from pulse to pulse. Shown in this Figure are mutually different resulting transmitting-antenna phase centers in the azimuth direction for three different activations of the transmitting antenna. Respective active transmitting antenna elements are represented by grey shading and inactive transmitting antenna elements are kept transparent.

Hereunder, it will be explained how this novel technology according to the invention makes it possible to compensate for a non-equidistant scanning and thus, by improved suppression of azimuth ambiguities and an improved signal/noise ratio SNR, to enhance the quality of the radar image.

In addition to the above, a further potential arises from the normally longer transmitting antenna which is adapted to the dimensions of the receiving antenna that anyway has a long length. Or, by use of well-proven T/R technology, the same antenna is used both for transmission and for reception. This makes it possible to use, in connection with a suitable tapering, longer transmitting apertures than before, so as to be able to better concentrate the irradiated signal energy onto the desired areas on the ground, which ultimately will result in reduced azimuth ambiguities and in an improved signal/noise ratio SNR and thus in an enhanced quality of the radar image.

Figure 12:
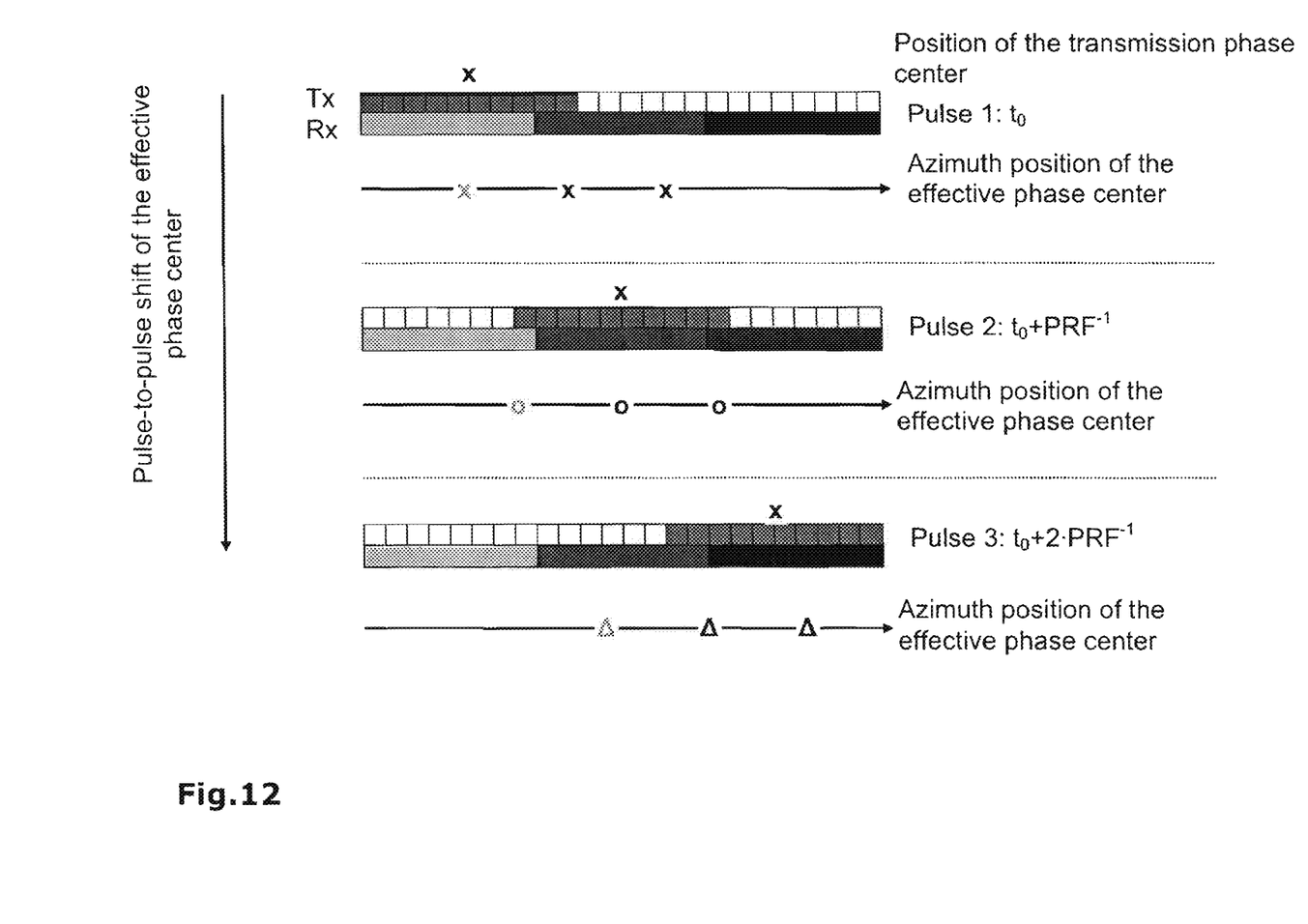
FIG. 12 shows effective phase centers of a transmitting/receiving antenna combination for three successive transmitting phase centers following each other from pulse to pulse.

In connection with a multi-aperture SAR receiving antenna, the effective phase centers of the transmitting/receiving antenna combination will occur, as already mentioned above, in the middle between the phase centers of the transmitting antenna and the respective receiving antenna. It can be seen that a pulse-to-pulse shift of the phase center of the transmitting antenna will shift all scan values belonging to the transmitted pulse by half of the shift of the transmitting-antenna phase center, as is shown in an exemplary manner in the three mutually underlying parts of FIG. 12 for a system comprising three receiving apertures, and for three different assignments of the transmitting antenna.

This means that the technology provided by the present invention, as compared to that of previous SAR systems, now makes it possible to shift the position of the scan values belonging to a transmitted pulse within certain limits by controlling the transmitting antenna in a suitable manner. Thus, by means of constant shifting from pulse to pulse, it is made possible to shift the position of the scan values each time by half the respective displacement.

Thereby, an unfavorable non-equidistant position of the scan values, as resulting from a non-optimal pulse repetition frequency PRF, can be compensated or even fully corrected for each pulse and is disturbed only by the switching of the transmitting-antenna phase center when the maximum displacement has been reached on the edge of the transmitting antenna. In this manner, it can finally be accomplished that all scan values have the same distance and thus, even for non-optimal PRF values, there is guaranteed—within a certain bandwidth—an equidistant scanning.

Figure 13:
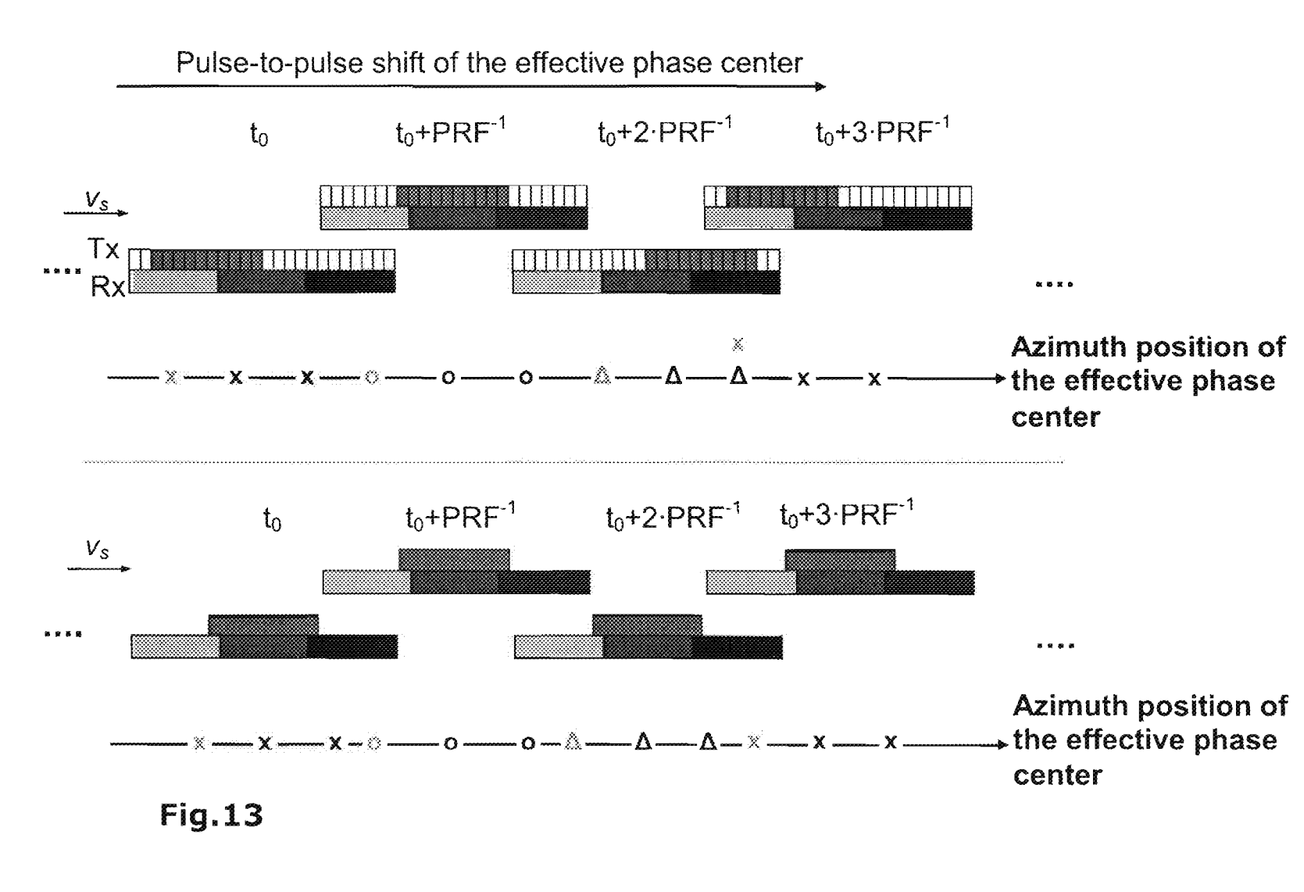
FIG. 13 shows a comparison of the scan values with (upper part of figure) and without (lower part of figure) pulse-to-pulse shift of the transmission-side phase center for a full cycle of the shift wherein, thus, the position of the transmission phase center on the antenna at the time $t_0$ corresponds to the position at the time $t_0+3 \cdot PRF^1$ and the pulse-to-pulse control of the transmission phase center makes it possible to transform an originally non-equidistant scanning (lower part of figure) into an equidistant scanning (upper part of figure)

FIG. 13 shows the case wherein the pulse repetition frequency PRF as compared to the optimal pulse repetition frequency PRF is too high, i.e. the respective last (right-hand) scan value in the flight direction (black receiving aperture) comes too close to the respective first (left) scan value (bright-grey receiving aperture) because the antenna has not yet moved on "far enough" when the next pulse is transmitted.

In this case, a piecewise shifting of the transmitting-antenna phase center from pulse to pulse, performed in adaptation to the pulse repetition frequency PRF, makes it possible to correspondingly shift all of the scan values in the flight direction so that, in the end, one will again obtain scan values distributed in an equidistant manner.

In this manner, particularly, too high PRF values can be conveniently trans-formed into an equidistant scanning because, herein, the phase center will wander in the flight direction and thus, when switching the phase center from the extreme right-hand position ("at the front" when viewed in the flight direction) to the extreme left position ("at the rear" when viewed in the flight direction), only a few overlapping scan values (cf. FIG. 13) do not have to be observed. In FIG. 13, an exemplary scenario has been selected wherein, after three pulses, the time of switching has been exactly reached.

FIG. 13 specifically shows a comparison between the scan values with (upper part of figure) and without (lower part of figure) pulse-to-pulse shift of the transmitting-antenna-side phase center for a full cycle of the shift, wherein the position of the transmitting phase center on the antenna at the time $t_0$ thus corresponds to the position at the time $t_0+3 \cdot PRF^1$. Controlling the transmission phase center from pulse to pulse makes it possible to transform an originally non-equidistant scanning (lower part of figure) into an equidistant scanning (upper part of figure).

In an analogous manner, also too low PRF values in comparison to the optimal value can be corrected by shifting the transmission phase center from pulse to pulse against the flight direction so as to compensate the too large distance between the "last" scan value of one pulse and the "first" scan value of the subsequent pulse. In this case, however, a small gap in the scan values will be generated when switching the phase center from the extreme left position to the extreme right position, while, on the other hand, this gap will lead to a distinctly lower loss of performance than would be the case for a constant transmission-side phase center.

In this regard, it holds true that, the larger the maximum possible shifting of the phase center is—i.e., after all, the larger the antenna is—the larger the compensated PRF range will be then.

The smaller the individual element is, the better the accuracy of the control of the phase center will be, because the size of the element determines the minimally possible step width of the shift between the pulses.

Thus, in connection with a reception-side digital beam formation as known from the state of the art, there can be performed, e.g. by shifting the phase center, a "coarse" setting, and the fine correction can be performed by the processing. In other words, one could say that the possibility of the pulse-to-pulse adjustment of the transmission-side phase center will significantly widen the flexibility and the application range of existing multi-aperture SAR systems.

The idea, forming the basis of the present invention, of a pulse-to-pulse adaptation of the position of the effective phase center in order to achieve the best possible equidistant scanning, can of course also be applied to the reception side and also to a plurality of apertures of a multi-aperture SAR antenna simultaneously. Therefore, the idea can be extended to the whole SAR system because, for the resultant spatial scanning, it is in principle irrelevant whether it is only the transmission-side, only the reception-side or both the transmission-side and the reception-side phase centers that will be shifted.

Figure 14:
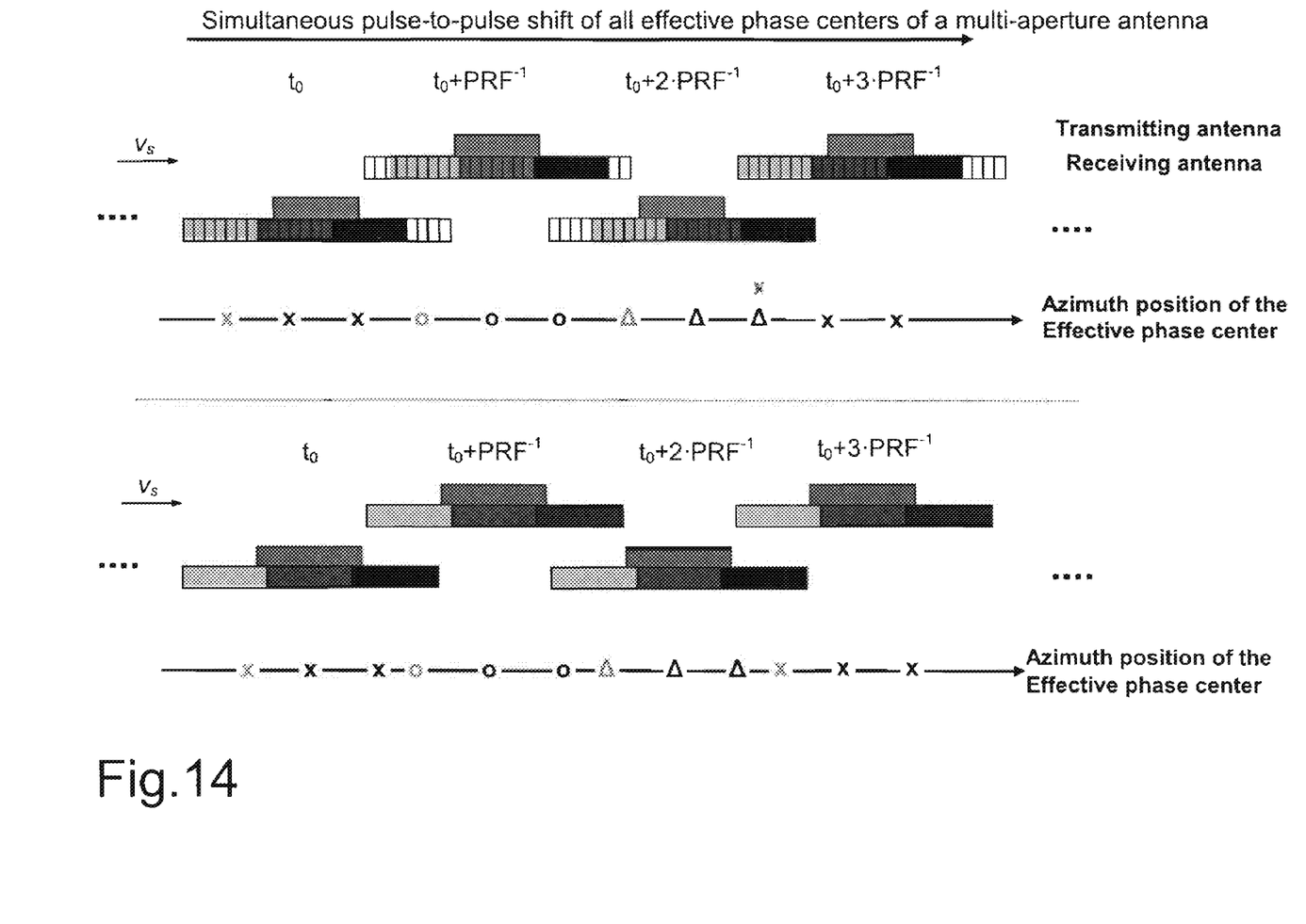
FIG. 14 shows, in the upper part of the figure, an adaptation of the position of the effective phase centers by a pulse-to-pulse shift of all phase centers of the multi-aperture receiving antenna, and a resulting equidistant scanning and, in the lower part of the figure, in comparison thereto, the resulting non-equidistant scanning for a conventionally configured and operated multi-aperture SAR antenna.

Thus, according to a further embodiment, there can be provided a somewhat lengthened receiving antenna which allows for an adaptive adjustment of the positions of the phase centers of all channels of a multi-aperture SAR receiving antenna, cf. FIG. 14. Generally, in this case, the ratio between used and unused antenna surfaces will be slightly less favorable than in the above described case of an adaptation on the transmitting-antenna side. However, irrespective of the slightly lesser flexibility, also the pulse-to-pulse shifting on the side of the receiving antenna will offer the opportunity to adapt the position of the effective phase centers. This approach is carried out in analogy to the process described with reference to FIG. 13.

FIG. 14 illustrates the process of the reception-side pulse-to-pulse shifting. Specifically, FIG. 14 shows, in the upper part of the figure, an adaptation of the position of the effective phase centers by a pulse-to-pulse shift of all phase centers of the multi-aperture receiving antenna, and the equidistant scanning resulting therefrom. In comparison thereto, the lower part of the figure in FIG. 14 shows the resulting non-equidistant scanning for a conventionally designed and operated multi-aperture SAR antenna.

Figure 15:
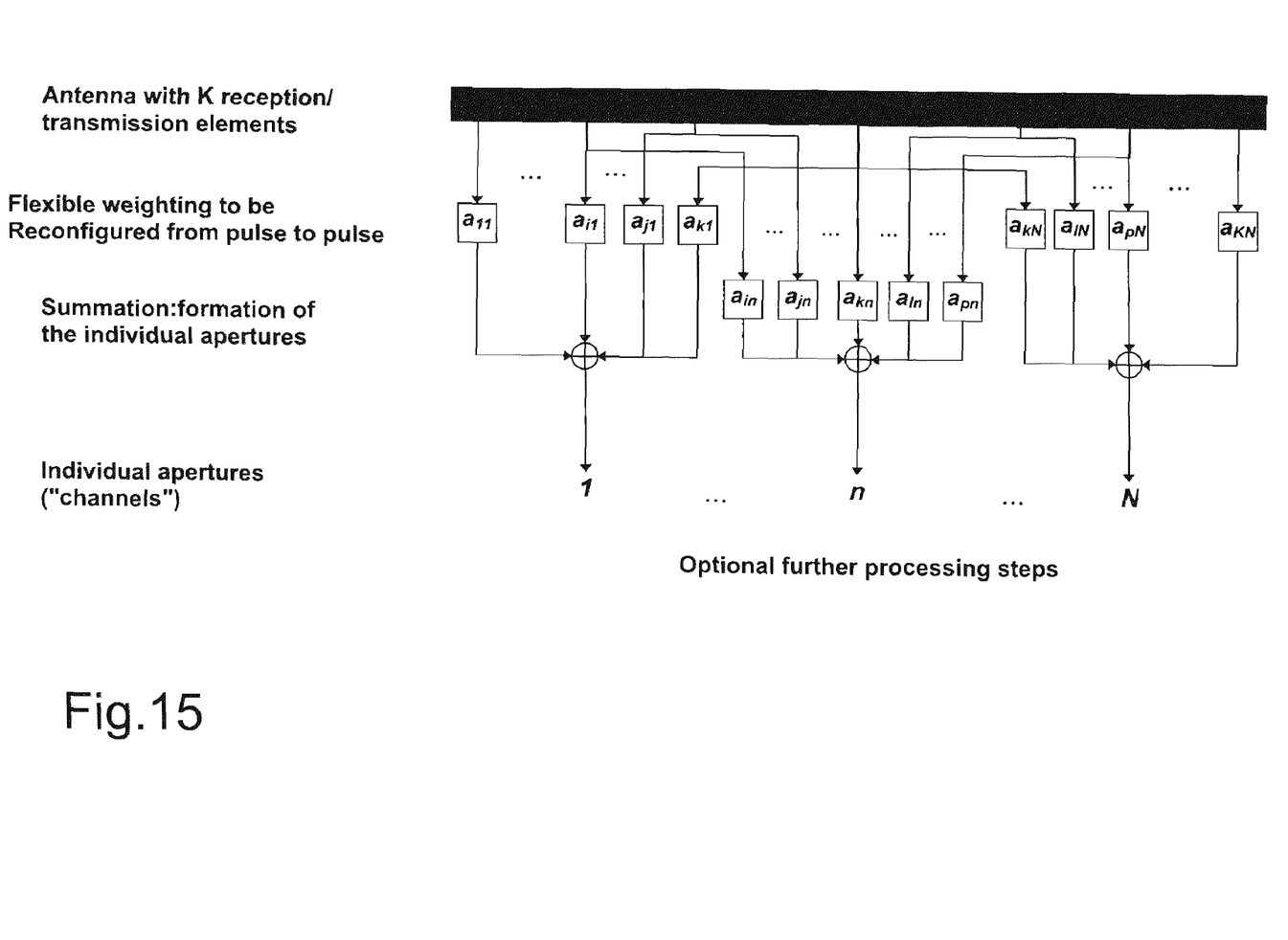
FIG. 15 shows a hardware architecture for flexible positioning of individual transmitting and receiving apertures, wherein the K individual elements of the antenna, for their "use" in each of the N individual apertures (channels), are weighted and summated differently and in a reconfigurable manner, and further processing steps such as e.g. a so-called "digital beam forming" may follow.

The principal architecture of the hardware which is required—on the transmission and the reception side alike—for accomplishing such a flexible shifting, is shown in FIG. 15. Connected downstream of the antenna made up of K individual elements is a network of filters for the weighting and the subsequent combining of the signals to N apertures ("channels"). Generally, this network will allow for each of the K elements to contribute, simultaneously and with a respective individual weighting, to the formation of up to N apertures.

In this regard, it is possible to perform this processing with the received and amplified HF signal prior to scanning, or to first perform an analog/digital conversion of this signal and then to perform the above processing on the digitized signal. Thus, FIG. 15 specifically shows a hardware architecture for the flexible positioning of individual transmitting and receiving apertures. For "use" in each of the N individual apertures, said K individual elements ("channels") of the antenna can be weighted and summated in a different and reconfigurable manner. This can be followed by further processing steps such as e.g. a digital beam formation.

As illustrated in FIG. 15, such a hardware architecture also allows for mutual overlapping of individual receiving apertures in that the signals of individual receiving elements are finally "used" in a plurality of apertures. This will further increase the flexibility of the adaptation of the phase-center position and will also allow, e.g., for changing the positions of the individual phase centers of a multi-aperture SAR antenna relative to each other.

In a further step, it is principally possible to select the weight coefficients $a_{ij}$ as frequency-dependent filter functions $a_{ij}(f)$.

Finally, it is also possible to allow for an adaptation of the phase centers simultaneously on the transmitting-antenna and the receiving-antenna sides, resulting in a further increase of the flexibility of the SAR system.

All of the exemplary realizations proposed above are suited for combination with a subsequent receiving-side digital beam formation, thus further increasing the performance and flexibility of the SAR system.

Thus, by performing said pulse-to-pulse shifting of the transmission-side phase center in the azimuth direction, the novel antenna control concept provided by the present invention makes it possible to accomplish a compensation or a complete correction of non-equidistant scanning in the azimuth direction. Herein, the idea of the pulse-to-pulse shift of the position of the effective phase center in order to obtain the best possible equidistant scanning, can be extended to the receiving-antenna side and to multi-aperture antennae.

Especially in combination with a subsequent digital beam-forming on the receiving-antenna side according to the previous state of the art, the proposed technology offers a wide potential for further improvement of the performance of multi-aperture SAR systems. In connection with an improved illumination of the interesting area on the ground by use of the enlarged antenna, a distinct improvement of the image quality is achieved.

LIST OF REFERENCE NUMERALS 1 ground strip
2 surface of incidence
3 antenna lobe
$d_{rx}$ individual aperture dimension in azimuth direction
PRF pulse repetition frequency
Rx receiving antenna; receiving antenna system
$Rx_1$, $Rx_2$, $Rx_3$ apertures of receiving antenna system
$t_0$, $t_1$, $t_2$ pulse transmitting times
Tx transmitting antenna; transmitting antenna system
$Tx_1$, $Tx_2$, $Tx_3$ apertures of transmitting antenna system
$v_s$ speed of carrier platform
x azimuth position

The invention claimed is:

1. A synthetic aperture radar method for remote surveillance of the surface of the earth using one or a plurality of carrier platforms moving at a constant speed over the surface of the earth, wherein said one or plurality of carrier platforms comprise a multi-aperture antenna system beam-controllable in the azimuth direction and directed obliquely downwards orthogonally to the moving direction and thus to the azimuth direction and consisting of a transmitting and receiving antenna system, and further comprise a coherently operating radar device periodically transmitting high-frequency transmission pulses at a pulse-repetition frequency via the transmitting antenna system and receiving echo signals via the receiving antenna system, wherein effective azimuth phase centers which are assigned to the received echo signals referred to as scan values, are arranged at a spatial site in the azimuth direction, which spatial site corresponds to the geometric center between the phase center of the transmitting antenna system that is actually electrically active during the transmission of the high-frequency pulses and the phase center of the receiving antenna system that is actually electrically active during the reception of the echo signals, wherein, by a position shift effected from transmission pulse to transmission pulse in the azimuth direction or opposite thereto of the electrically active phase center of the transmitting antenna system designed as a multi-aperture antenna which is beam-controllable in the azimuth direction, and/or of the electrically active phase center of the receiving antenna system designed as a multi-aperture antenna which is beam-controllable in the azimuth direction, the position of the effective azimuth phase center is continuously adapted in such a manner that, at the existing pulse repetition frequency, a substantially equidistant scanning is effected in the azimuth direction.

2. The radar method according to claim 1, wherein, when using a transmitting antenna system consisting of a plurality of separate antenna elements and a receiving antenna system consisting of a plurality of separate antenna elements, the antenna elements are individually controlled for beam control of the respective antenna system.

3. The radar method according to claim 2, wherein the controlling of the antenna elements consists in switching on and switching off these antenna elements.

4. The radar method according to claim 2, wherein the controlling of the antenna elements consists in assigning to each antenna element a variable phase and/or amplitude assignment for achieving a "tapering" of the antenna characteristic.

5. The radar method according to claim 2, wherein, in case that common antenna elements are used for the transmitting and the receiving antenna systems, the antenna elements are switched between the transmitting and the receiving operation through T/R technology by use of transmitting/receiving switches.

6. The radar method according to claim 2, wherein control of the antenna elements is performed in such a manner that only selected areas of the transmitting and receiving antenna system are used, so that the electrically active phase center of the respective antenna system is arranged at the geometric center of gravity of the antenna elements used.

7. The radar method according to claim 2, wherein, in a network architecture of filters following the antenna elements comprising the transmitting and receiving antenna system, the signals are weighted and then combined to a plurality of apertures, wherein, on the reception side, this processing is performed on the digital echo signal with the received and amplified high-frequency echo signal prior to scanning, but also after a digital/analog conversion.

8. The radar method according to claim 7, wherein said network architecture is operative in such a manner that the apertures overlap each other on the transmission and/or reception sides so that the high-frequency pulses of individual transmitting antenna elements and respectively the echo signals of individual receiving antenna elements are used in a plurality of apertures.

9. The radar method according to claim 7, wherein the weighting coefficients in the network architecture are selected as frequency-independent filter functions.

10. The radar method according to claim 1, wherein pre-processing the received and digitized signals in the azimuth direction is performed prior to the actual SAR processing in the form of a so-called "digital beamforming on the receiving side" which is based on a Doppler-frequency-depending weighting and a subsequent coherent summation of the individual received signals and which serves primarily for suppressing azimuth ambiguities occurring due to non-equidistant scanning.

11. The radar method according to claim 10, wherein, by the shifting of the electrically active phase centers of the transmitting and respectively receiving antenna system and thus of the effective phase center of the whole antenna system, there is performed a rough setting of the equidistant scanning and, through the pre-processing by means of digital beamforming on the receiving side, a fine correction.

12. The radar method according to claim 1, wherein the receiving antenna system in comparison to the transmitting antenna system is given a longer dimension in the azimuth direction.

* * * * *